United States Patent [19]

Yamada et al.

[11] Patent Number: 4,755,893
[45] Date of Patent: Jul. 5, 1988

[54] TRACKING CONTROL APPARATUS USING PILOT SIGNALS AND POSITION DETECTING SIGNALS OF VARIOUS LENGTHS

[75] Inventors: Makoto Yamada, Tokyo; Hiraku Sugiki, Saitama; Kentaro Odaka, Tokyo, all of Japan

[73] Assignee: Sony Corporation, Tokyo, Japan

[21] Appl. No.: 915,561

[22] Filed: Oct. 6, 1986

[30] Foreign Application Priority Data

Oct. 8, 1985 [JP] Japan ................................. 60-224039

[51] Int. Cl.⁴ ............................................. G11B 5/584
[52] U.S. Cl. ........................................... 360/77; 360/18
[58] Field of Search ...................... 360/77, 73, 70, 32, 360/27, 18; 358/323

[56] References Cited

U.S. PATENT DOCUMENTS 4,656,539  4/1987  Sugiki et al. .......................... 360/77

FOREIGN PATENT DOCUMENTS 0174789  3/1986  European Pat. Off. .............. 360/77

Primary Examiner—Raymond F. Cardillo
Assistant Examiner—Steven R. Garland
Attorney, Agent, or Firm—Alvin Sinderbrand

[57] ABSTRACT

In a tracking control apparatus for controlling tracking alignment of a rotary head with respect to record tracks appearing in succession on a record medium and in each of which there are recorded, at predetermined positions varying from track to track in accordance with a predetermined repeating sequence, pilot signals for controlling tracking and position detecting signals having different recorded length and which identify the positions of the pilot signals. An identifying signal for identifying the recorded length of a position detecting signal recorded in a track being traced by the rotary head is generated from the output of the rotary head, and a sampling signal is generated in response to the identifying signal for sampling a pilot signal reproduced as cross-talk from an adjacent track so as to reduce the pull-in time of the tracking alignment operation.

9 Claims, 9 Drawing Sheets

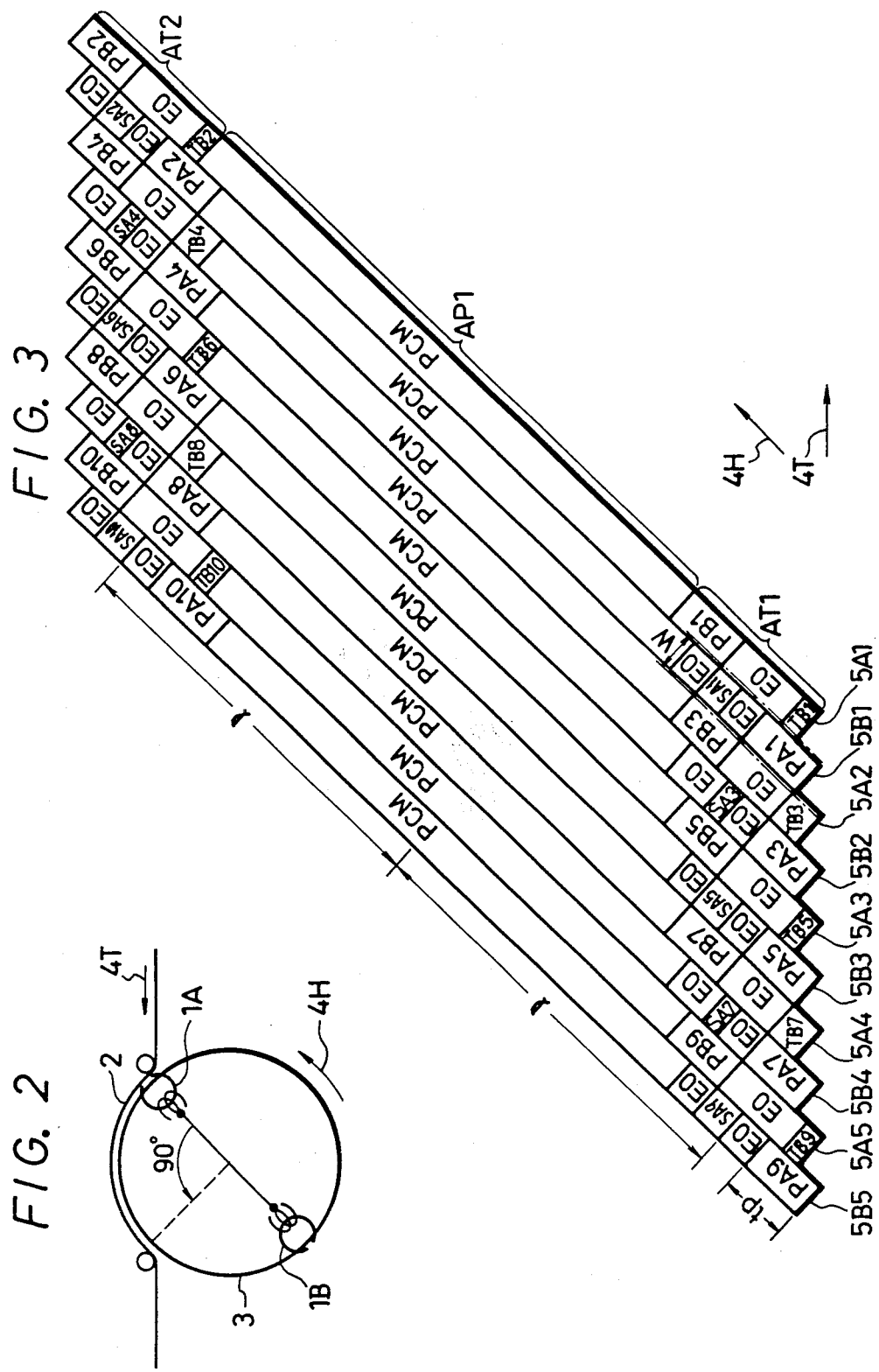

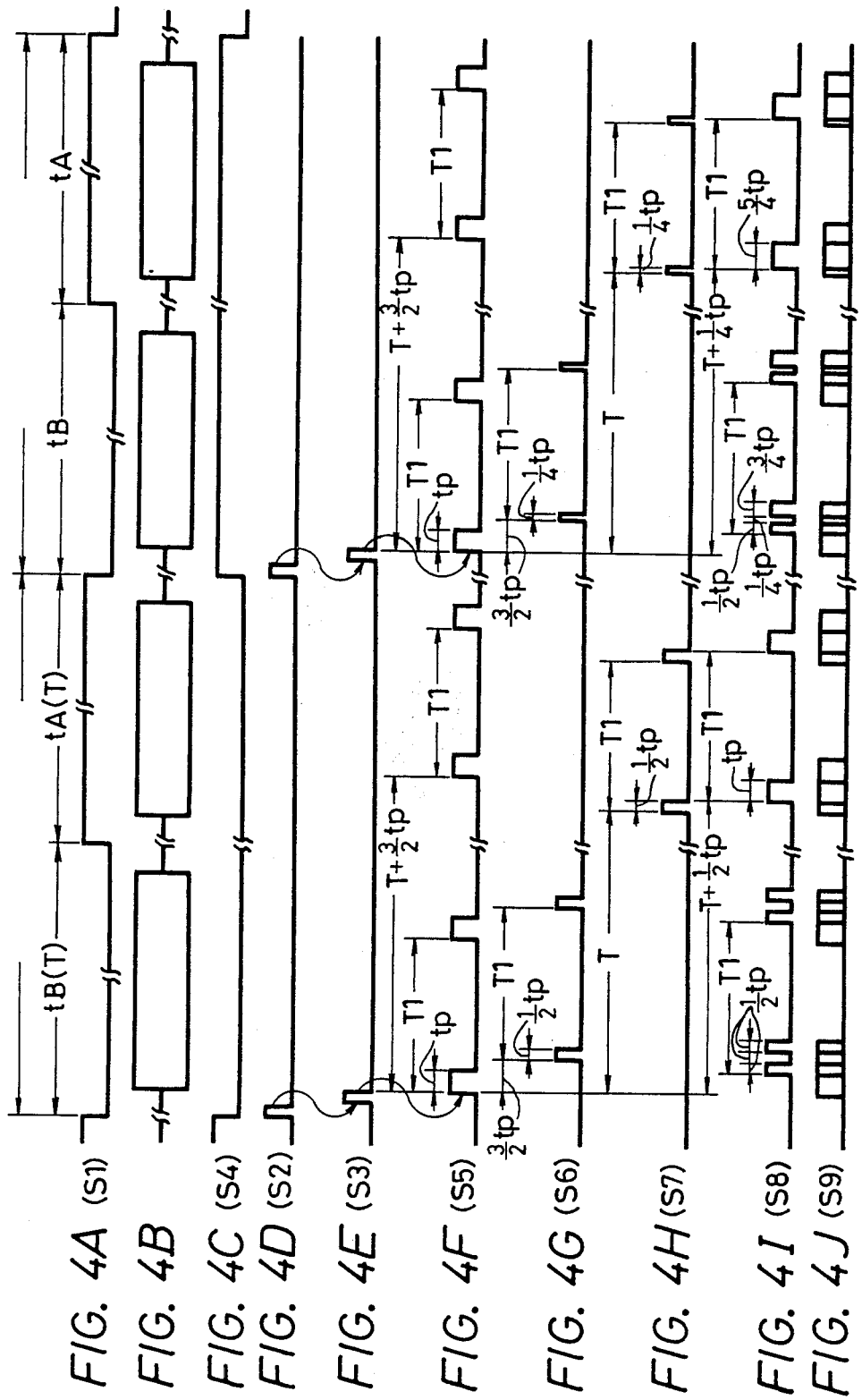

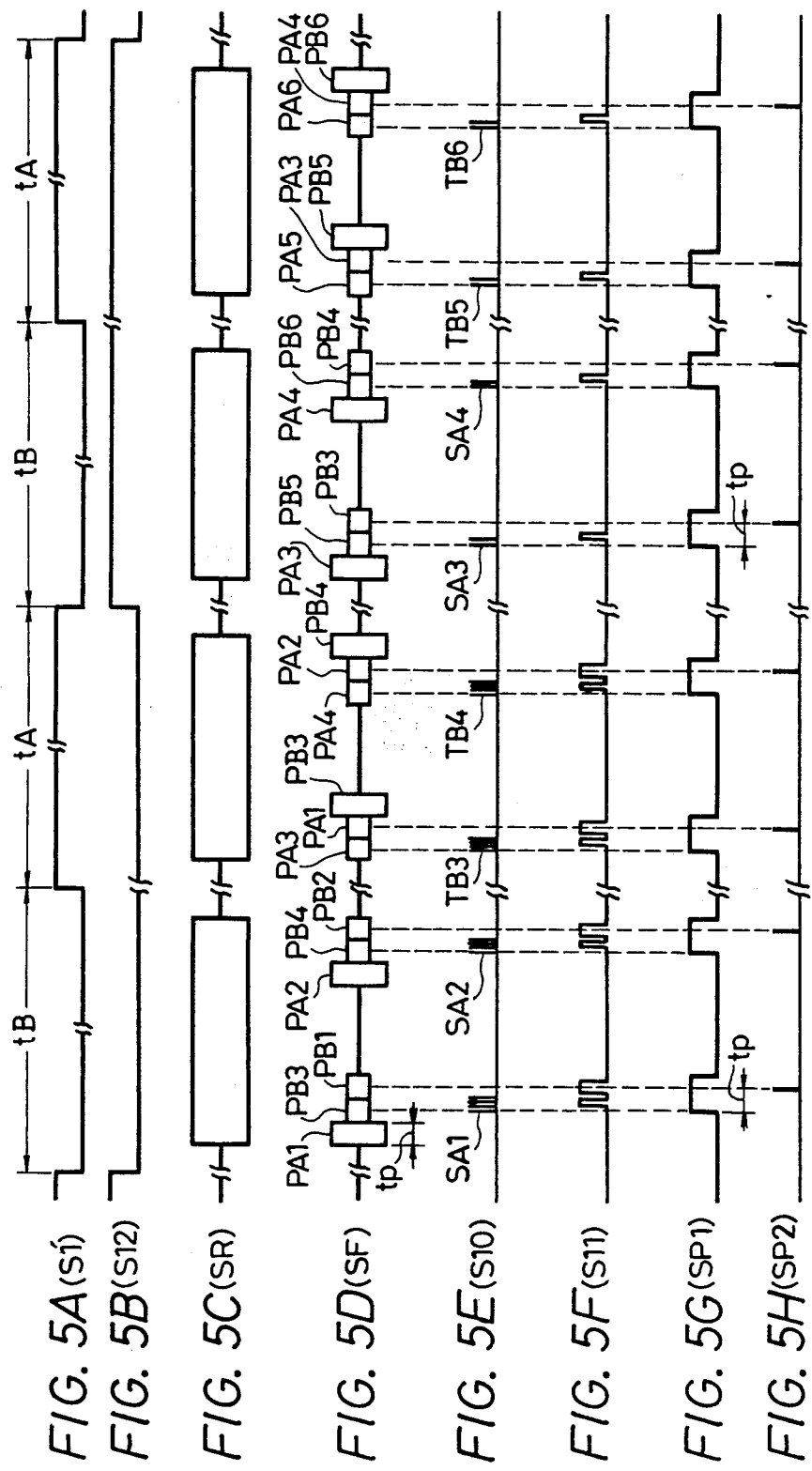

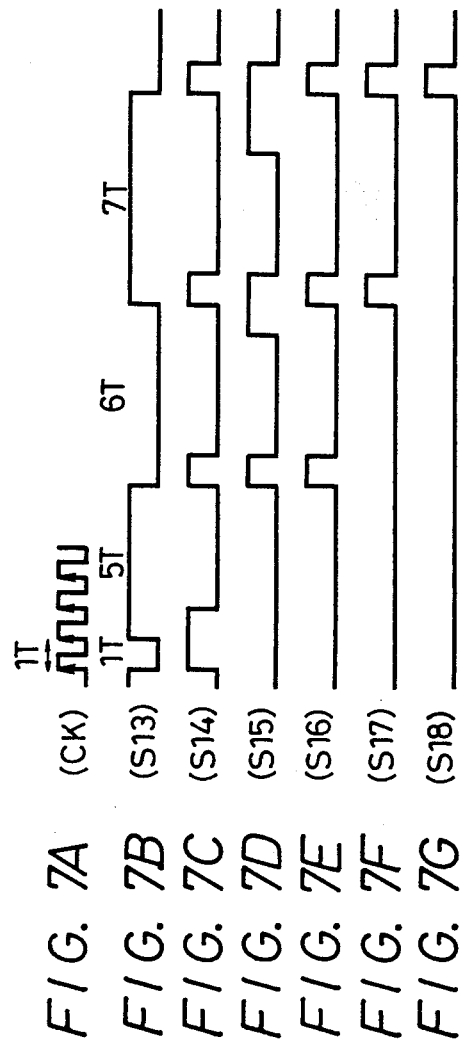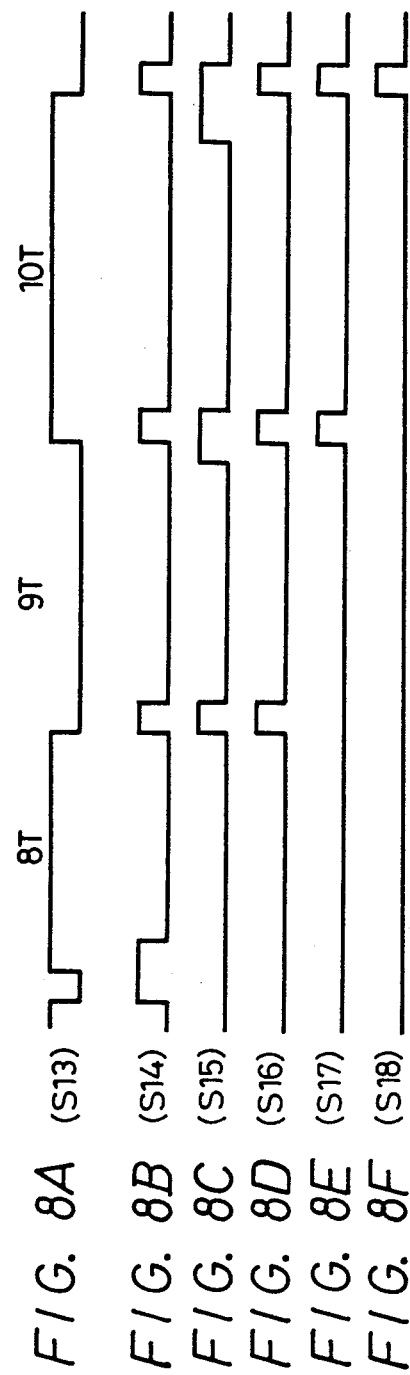

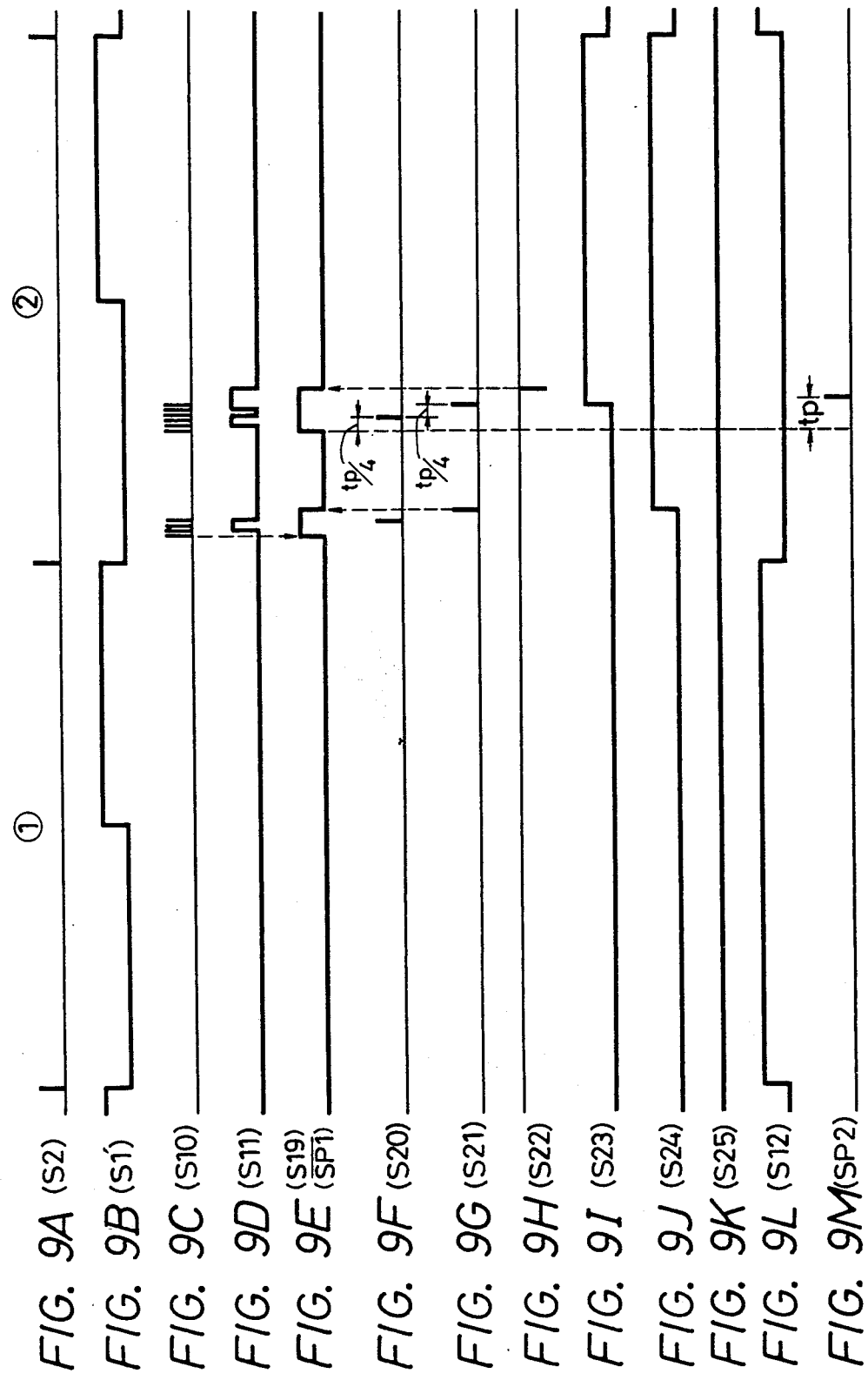

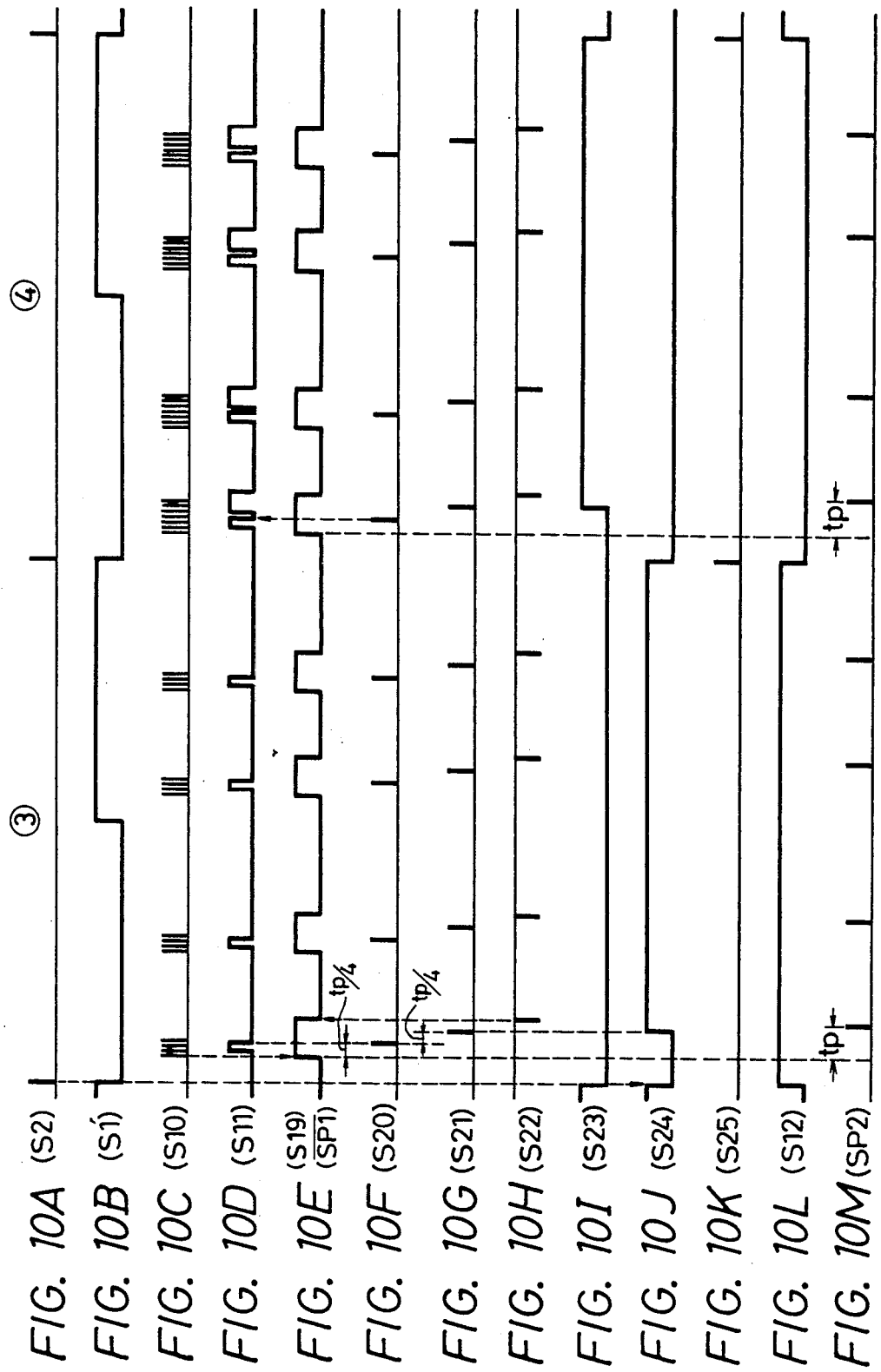

TRACKING CONTROL APPARATUS USING PILOT SIGNALS AND POSITION DETECTING SIGNALS OF VARIOUS LENGTHS

BACKGROUND OF THE INVENTION

1. Field of the Invention

This invention relates generally to tracking control apparatus, and more particularly is directed to an improved tracking control apparatus suitable for use with a digital signal reproducing apparatus.

2. Description of the Prior Art

The assignee of the present application has previously proposed a method for controlling tracking of a rotary reproducing head and which uses only a reproduced output from such rotary reproducing head, that is, which effects tracking control without the need for a stationary head.

This tracking control method is based on the idea that a PCM (pulse-code-modulated) signal can be easily timebase-compressed and/or timebase-decompressed and, therefore, the PCM signal is not necessarily recorded and/or reproduced continuously or in real time as is required in the case of an analog signal. Thus, the PCM signal can be recorded in one area of each of a succession of tracks on the record medium and other signals, can be recorded in other areas which are different from the recording area for the PCM signal in each track.

Specifically, when the PCM signal is timebase-compressed and recorded on a record medium by a plurality of rotary heads so as to form successive slant tracks without any guard bands therebetween, pilot signals for use in tracking are recorded on an area of each track which is independent, in the longitudinal direction of the track, from the recording area for the PCM signal. Upon reproducing, each track is traced by a rotary head whose tracing width is wider than the width of the track and the tracking alignment of the rotary head is controlled with reference to reproduced pilot signals derived from both tracks adjacent to the track which is being traced by the rotary head.

In a tracking alignment control method of the above type previously proposed by the assignee of the present application, a plurality of position detecting signals which differ in frequency for adjacent tracks and which are different in recording length for adjacent tracks having the same frequency, are recorded in the tracks in accordance with a repeating sequence of a predetermined number of record tracks.

Upon reproducing, when a record track is traced by a rotary head whose tracing width is wider than that of the track, a pulse signal is formed on the basis of the starting point of a position detecting signal recorded in such track and, at the time of this pulse signal and in response thereto, a pilot signal is detected from a track adjacent to the track being traced by the rotary head and tracking alignment of the rotary head is controlled with reference to the detected pilot signal. This previously proposed method is disclosed in detail in U.S. patent application Ser. No. 761,025, filed July 31, 1985, and having a common assignee herewith. Moreover, said U.S. application corresponds to EP Laid-Open patent application Ser. No. 0171266. In such disclosed method, during reproducing, when an identifying signal is at a low level, a position detecting signal having a long recording length is detected, and, when the identifying signal is at a high level, a position detecting signal having a short recording length is detected. If the identifying signal results from frequency-dividing a switching pulse or change-over signal, a sampling pulse used to detect the tracking error is generated only when the recording length of a position detecting signal detected from the track being more or less traced by the rotary head coincides with the polarity or level of the identifying signal for detecting a position detecting signal of that recording length.

However, when the signal for identifying tracks having position detecting signals with different recording lengths is generated independently of the signal reproduced from the record medium by the rotary head, as is the signal resulting from frequency-dividing the switching pulse in the above-mentioned U.S. patent application Ser. No. 761,025, there occurs the following problem. Even in the on-track state, that is, when there is no tracking error, if the identifying signal is not coincident in polarity or level with the recording length of the position detecting signals in the track being traced by the rotary head, no sampling pulse for detecting a tracking error is generated. As a result, upon reproducing, if the rotary head is once diverted from the on-track state, for example, due to the drift of the tape speed, the rotary head becomes stable after the rotary head traces the track once removed from the adjacent track. In other words, the tracking is not stablized until the rotary head traces the track once removed from the adjacent track, thus increasing the time required for the tracking control to be carried out in the stable manner, that is, the pull-in time.

OBJECTS AND SUMMARY OF THE INVENTION

Accordingly, it is an object of this invention to provide an improved tracking control apparatus of the described type.

It is another object of the invention to provide a tracking control apparatus in which upon reproducing, the track adjacent to, or next removed from the adjacent track containing a position detecting signal having a different recording length is identified by the detecting state of a position detecting signal which is reproduced at present, whereby to reduce the pull-in time for tracking alignment.

It is a further object of this invention to provide a tracking control apparatus suitable for use with a digital signal reproducing apparatus.

According to one aspect of this invention, in a tracking control apparatus for controlling tracking alignment of a rotary head with respect to record tracks appearing in succession on a record medium and in each of which there are recorded, at predetermined positions varying from track to track in accordance with a predetermined repeating sequence, pilot signals for controlling tracking and position detecting signals having different recording lengths and which identify said positions of the pilot signals in adjacent tracks, comprising; reproducing means are responsive to the output of the rotary head for reproducing the position detecting signals recorded in a track traced by said rotary head, detecting means detect the recorded length of each position detecting signal reproduced by the reproducing means, means are responsive to said detecting means for providing an identifying signal which identifies said recording length of a position detecting signal reproduced from the track traced by said rotary head; and generating means responsive to said identifying signal for generating sampling signals times to sample the pilot signals reproduced as cross-talk from tracks adjacent to said track being traced by said rotary head.

The above, and other objects, features and advantages of the present invention, will becomes apparent from the following detailed description of a preferred embodiment to be read in conjunction with the accompanying drawings, throughout which the same reference numerals designate like elements and parts.

BRIEF DESCRIPTION OF THE DRAWINGS

FIG. 2 is a diagram showing one example of a rotary head assembly used in the tracking control apparatus shown in FIG. 1;

FIG. 3 is a schematic representation showing a recording track pattern used in accordance with the present invention;

FIG. 4A to 4J are signal waveform disgrams to which reference will be made in explaining the recording operation of the tracking control apparatus shown in FIG. 1;

FIGS. 5A to 5H are signal waveform diagrams to which reference will be made in explaining the reproducing operation of the tracking control apparatus shown in FIG. 1;

FIGS. 7A to 7G, 8A to 8F, 9A to 9M and 10A to 10M are signal waveform diagrams to which reference will be made in explaining the operation of the main portion of the tracking control apparatus shown on FIG. 6.

DESCRIPTION OF THE PREFERRED EMBODIMENT

Figures 1, 1A:
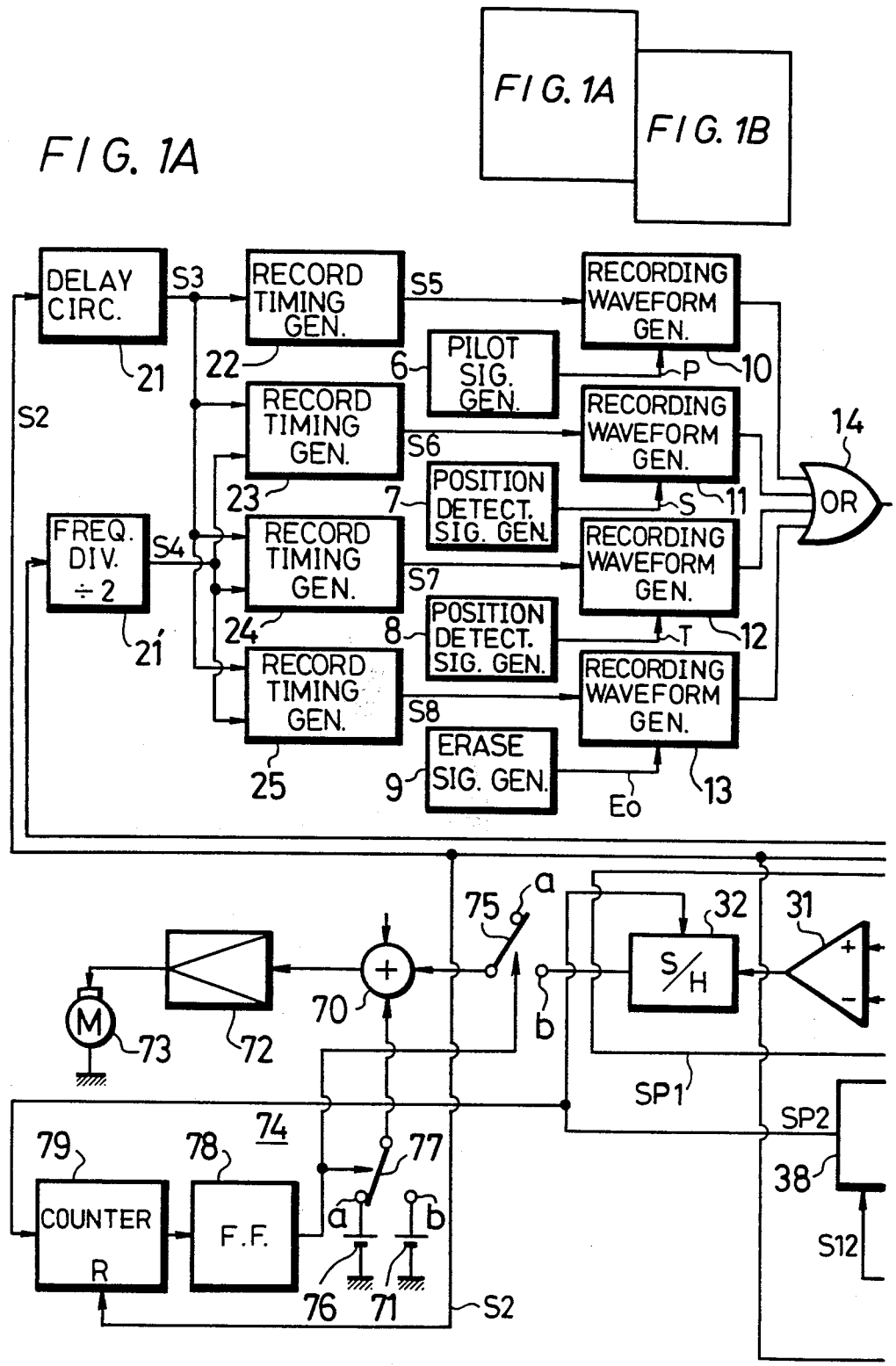
FIG. 1 (formed of FIGS. 1A and 1B) is a block diagram showing an embodiment of a tracking control apparatus according to this invention.
Figure 1B:
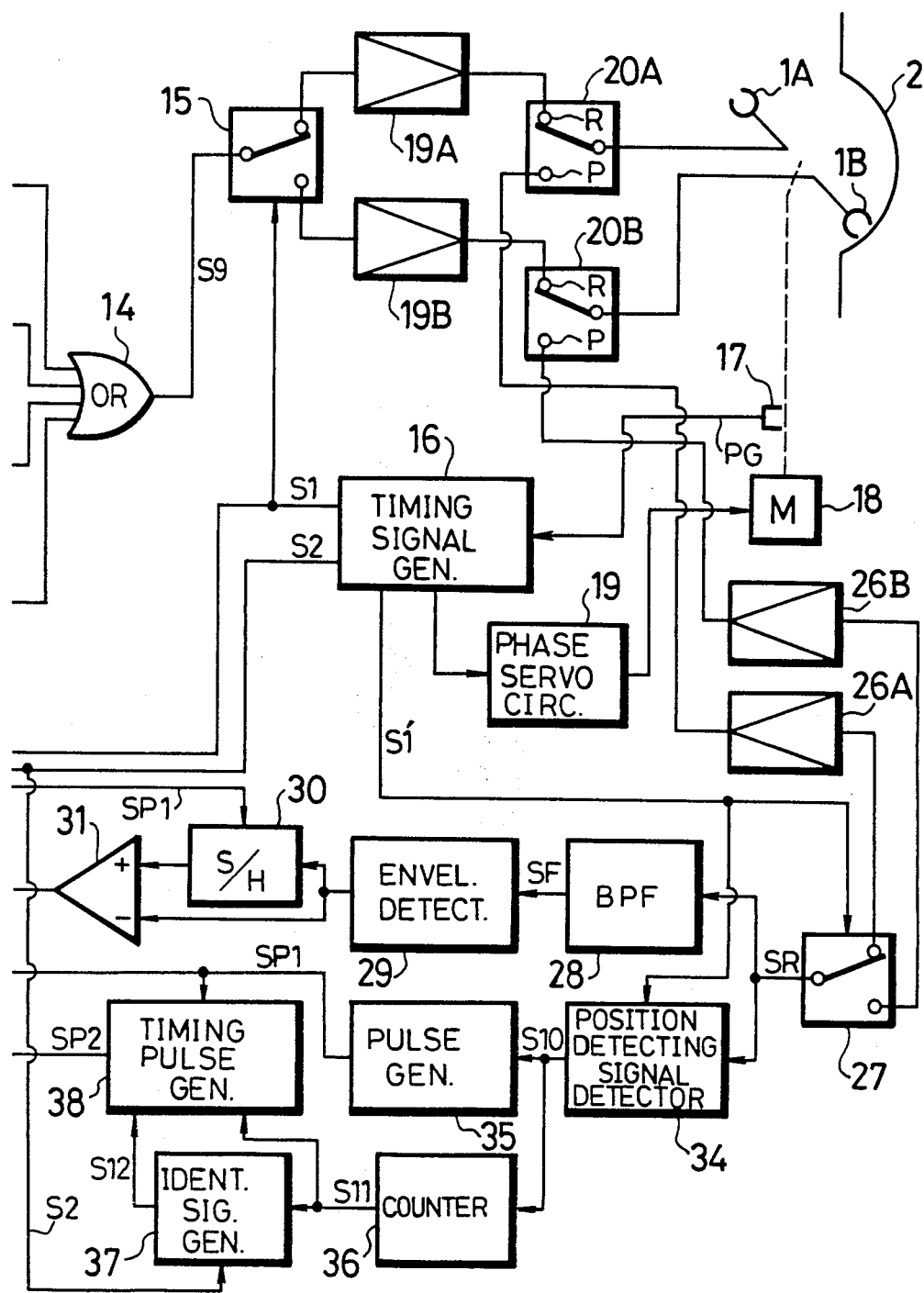

FIG. 1 (formed of FIGS. 1A and 1B drawn on two sheets of drawings to permit the use of a suitably large scale) schematically illustrates a circuit arrangement employed in an embodiment of the tracking control apparatus according to this invention, and which is used to record and reproduce pilot signals for tracking, position detecting signals and erase signals. In other words, FIG. 1 only illustrates the circuit arrangement for recording and reproducing those signals with which the present invention is directly concerned, and, therefore, the circuit arrangement for recording and reproducing the information signal, such as, for example, a PCM signal, is omitted from FIG. 1.

Referring in detail to FIG. 1, it will be seen that reference numerals 1A and 1B designate rotary magnetic heads and that reference numeral 2 denotes a magnetic tape which is used as the record medium. As shown in FIG. 2, the rotary heads 1A and 1B are mounted on the periphery of a tape guide drum 3 and angularly separated by 180°. The magnetic tape 2 is shown to be wrapped around the outer periphery of the tape guide drum 3 to an angular extent less than 180°, for example, an angular extent of 90°. The rotary heads 1A and 1B are rotated at the rate of 30 revolutions per second in the direction shown by an arrow 4H, while the magnetic tape 2 is transported in the direction shown by an arrow 4T at a predetermined speed, so that slanted magnetic tracks 5A and 5B (FIG. 3) are formed on the magnetic tape 2 one by one by the rotary heads 1A and 1B, respectively, in the so-called overlapped writing state, that is, a width (tracing width) W of each head gap is selected to be greater than the track width. In this case, the gaps of the rotary heads 1A and 1B extend in different directions relative to the direction perpendicular to their tracing directions. In other words, the so-called azimuth angles of the rotary heads 1A and 1B are selected to be different from each other to take advantage of the azimuth effect for cancelling or attenuating cross-talk.

It will be appreciated that there is a period during each revolution of the head assembly in which neither of the two rotary heads 1A and 1B is in contact with the magnetic tape 2, and this period corresponds to an angular range of 90° in the illustrated embodiment. If this non-contact period is used to perform the addition of redundant data during recording and to perform error correction and the like during playback, it is possible to simplify the system.

Referring back to FIG. 1, it will be seen that a pilot signal oscillator or generator 6 is provided for producing a tracking pilot signal P, which has a frequency $f_0$ selected to be, for example, about 200 kHz, and which is recorded at a relatively high level. If linearity between a tracking phase displacement and a reproduced pilot signal output is to be ensured, the frequency $f_0$ of tracking pilot signal P is desired to be a frequency presenting a relatively small amount of azimuth loss.

Position detecting signal generators 7 and 8 are provided for respectively producing position detecting signals S and T that are used to detect the position of the pilot signal P. These position detecting signals S and T are also used as an erase signal for the pilot signal P. In other words, when new information is to be recorded on a magnetic tape on which information was previously recorded while erasing the previously recorded information, since it is not ascertained that the new record track is always coincident with the corresponding previously recorded track, the signals S and T are used when the previously recorded pilot signal has to be erased. The frequencies $f_1$ and $f_2$ of position detecting signals S and T are selected to be substantially different from the frequency $f_0$ of pilot signal P, for example, the frequencies $f_1$ and $f_2$ may be around 500 kHz and 700 kHz, respectively. Further, the recording levels of signals S and T are selected to ensure that the pilot signal P will be effectively erased thereby.

Reference numeral 9 designates an oscillator or generator that generates an erase signal $E_0$. In the embodiment being described, it is preferable that erase signal $E_0$ have a high erase ratio to erase the tracking pilot signal P and the position detecting signals S and T when the signals P, S and T are written in an overlapped fashion. The frequency $f_3$ of the erase signal $E_0$ is selected to be, for example, around 2 MHz.

Recording waveform generators or gating circuits 10, 11, 12 and 13 are provided which respond to an edge, for example, a trailing edge, of a respective delayed signal $S_5$, $S_6$, $S_7$ or $S_8$ associated with a pulse PG, as hereinafter described in detail, to produce signals as follows: Recording waveform generator 10, on the basis of the respective gating signal $S_5$, passes pilot signal P from the pilot signal generator 6 for a predetermined time interval tp (for example, 76.5 $\mu$sec) in accordance with the number and arrangement of the pilot signals P to be recorded in a track. Recording waveform generators 11, 12 and 13, on the basis of gating signals $S_6$, $S_7$ and $S_8$, respectively, pass position detecting signals S and T and erase signal $E_0$ from the generators 7,8 and 9, respectively, for predetermined time intervals in accordance with the number and arrangement of the position detecting signals S,T and the erase signal $E_0$ to be recorded in a track. An OR gate circuit 14 is provided to receive the outputs from generators 10 to 13.

A switching circuit 15 is provided to change-over connections to rotary heads 1A and 1B in response to a switching signal S1 (FIG. 4A) derived from a timing signal generator 16. Timing signal generator 16 is supplied with the pulse PG having a frequency of 30 Hz, and which is generated by a pulse generator 17 in synchronism with the rotation of a motor 18 that drives rotary heads 1A and 1B. Thus pulse PG is indicative of the rotary phase of rotary heads 1A and 1B. A pulse signal with a frequency of 30 Hz is supplied from timing signal generator 16 in response to pulse PG, and is applied to a phase servo circuit 19 by which the rotary phase of motor 18 is controlled.

The pilot signal, position detecting signals and erasing signal from switching circuit 15 which is changed-over in response to switching signal S1 are amplified by an amplifier 19A or 19B and then supplied through a contact R of a record/playback switching circuit 20A or 20B to rotary head 1A or 1B for recording by the latter on magnetic tape 2. Switching circuits 20A and 20B are connected to engage their contacts R upon recording, and to engage their contacts P upon playback.

An output signal S2 (FIG. 4D) from timing signal generator 16 is supplied to a delay circuit 21 in which it is delayed by a delay time determined in accordance with the interval of rotary heads 1A,1B and the mounting position of pulse generator 17, and the like. A delayed output signal S3 (FIG. 4E) from delay circuit 21 is fed to each of recording timing generators 22,23,24 and 25. The switching signal S1 from timing signal generator circuit 16 is frequency-divided by 2 in a frequency divider 21' to provide a signal S4 having a frequency $\frac{1}{2}$ that of signal S1 (FIG. 4C) and which is supplied to recording timing generators 23, 24 and 25. The recording timing generators 22,23,24 and 25 generate the gating or timing signals $S_5$, $S_6$, $S_7$ and $S_8$ which are used as recording references for the pilot signal and the like. In the embodiment being described, the trailing edge of signal S3 (FIG. 4E) a delayed by delay circuit 21 is made coincident with the time at which a first rotary head, for example, the head 1B, comes in contact with the tape during each rotation period.

Recording timing generator 22 produces signal S5 (FIG. 4F) to include a first pulse synchronized with the trailing edge of signal S3 at the commencement of the half rotation period of one of the heads, for example, the half rotation period of rotary head 1B, and another first pulse delayed by a time interval T+3/2tp (in which T represents the time corresponding to the half rotation period of a head) from the trailing edge of the signal S3 so as to occur during the half rotation period of the other head 1A. Each of the above described first pulses of signal S5 is followed, at a time interval T1, by a similar second pulse, and all such pulses of signal S5 have a duration time of tp.

The recording timing generator 23 generates signal S6 (FIG. 4G) to include a first pulse delayed by the time 3/2tp from the trailing edge of signal S3 and followed, at the predetermined time interval T1, by a second pulse. Such first and second pulses of signal S6 occur only during the half rotation period of one of the heads, for example, during only the half rotation period of head 1B. Further, for example, during each odd-numbered rotation of the heads, the duration time of each pulse of signal S6 is $\frac{1}{2}$tp, whereas, during each even-numbered rotation of the heads, the duration time of each pulse os signal $S_6$ is $\frac{1}{4}$tp.

The recording timing generator 24 generates a signal S7 (FIG. 4H) to include a first pulse delayed from the trailing edge of signal S3 by the time interval T and occurring during only during the half rotation period of the other head, for example, only the half rotation period of the head 1A, and a second pulse following the first pulse of signal S7 by a predetermined interval T1. Further, the duration time of each pulse of signal S7 is $\frac{1}{2}$tp during each odd-numbered rotation of the heads, while the duration time of each such pulse is $\frac{1}{4}$tp during the even-numbered rotation of the heads.

Recording timing generator 25 generates signal S8 (FIG. 4I) as follows: During the half rotation period of head 1B in an odd-numbered rotation of the heads, signal S8 includes a first pair of pulses, the first pulse of which is delayed by time tp from the trailing edge of signal S3 with a time interval of $\frac{1}{2}$tp between the pair of pulses and with a similar pair of pulses at the time interval T1 after the first pair. Further, each of these pulses has the duration of $\frac{1}{2}$tp. During the half rotation period of the other head 1A in an odd-numbered rotation of the heads, there is generated a first pulse having a duration time tp and delayed by time T+$\frac{1}{2}$tp from the trailing edge of signal S3 and a second similar pulse at the predetermined interval T1 after the corresponding first pulse. On the other hand, during the half rotation of head 1B in an even-numbered rotation of the heads, there are generated a first pair of pulses delayed by a time tp from the trailing edge of signal S3 and whose duration times are respectively $\frac{1}{2}$tp and $\frac{3}{4}$tp with an interval $\frac{1}{4}$tp therebetween, and a second pair of similarly configured pulses following the first pair by the interval T1. Further, during the half rotation period of head 1A in an even-numbered rotation period of the heads, there is generated a first pulse delayed by a time T+$\frac{1}{4}$tp from the trailing edge of signal S3 and whose duration time is 5/4tp, with a similar second pulse of 5/4tp duration being generated at the interval T1 after such first pulse.

As earlier noted, signal S5 (FIG. 4F), signal S6 (FIG. 4G), signal S7 (FIG. 4H) and signal S8 (FIG. 4I) from recording timing generators 22,23,24 and 25 are supplied as gate signals to recording waveform generators 10,11,12 and 13, respectively, so that pilot signal P, position detecting signals S and T and erase signal $E_0$ from generators 6,7,8 and 9 are supplied through recording waveform generators 10,11,12 and 13, respectively, to OR gate circuit 14 as shown in FIG. 1 only during the above described pulses of signals $S_5,S_6,S_7$ and $S_8$. Thus, the signals P,S,T, and $E_0$ are developed at the output side of OR gate circuit 14 as a composite signal S9 (FIG. 4J).

Referring again to FIG. 1, it will be seen that amplifiers 26A and 26B are provided, which are supplied with the reproduced outputs from the corresponding rotary heads 1A and 1B when switching circuits 20A and 20B are changed in position to engage their contacts P in the playback mode. The outputs of amplifiers 26A and 26B are supplied to a switching circuit 27. Switching circuit 27 is alternately changed-over by a switching signal S1' (FIG. 5A) of 30 Hz frequency from the timing signal generator 16 so as to connect to amplifier 26A during the half rotation period including the tape contact period of head 1A and to connect to amplifier 26B-during the half rotation period including the tape contact period of the head 1B.

A band pass filter 28 having a narrow pass band with a center frequency $f_0$ is provided to pass only the pilot signal P from the reproduced output of switching circuit 27. An envelope detector 29 is provided to envelope-detect the output from band pass filter 28 and the output from envelope detector 29 is sampled and then held by a sample and hold circuit 30. A comparator or differential amplifier 31 is provided to compare the outputs from the envelope detector 29 and the sample and hold circuit 30. A sample and hold circuit 32 is provided to sample and hold the compared output or error signal from differential amplifier 31. These sample and hold circuits 30 and 32 function to sample and hold a crosstalk component of the pilot signals recorded on both end portions of the tracks adjacent to the track being traced in the normal playback mode as will be described later. Then, the output from sample and hold circuit 32 is used as a tracking control signal.

In order to form the sampling pulses for the sample and hold circuits 30 and 32, a position detecting signal detector 34 is connected to the output side of switching circuit 27 to detect the position detecting signals S and T in the reproduced output. The output S10 (FIG. 5E) from detector 34 is supplied to a pulse generator 35 and to a counter 36. The pulse generator 35 is adapted to generate a first sampling pulse SP1 (FIG. 5G) in synchronism with the leading edge of detected output S10 (FIG. 5E) from position detecting signal detector 34. The sampling pulse SP1 is supplied to sample and hold circuit 30.

The counter 36 is adapted to count the number of waves or pulses contained in output signal S10 from signal detector 34. If the counted wave number corresponds to a position detecting signal whose recording length is long, the counter 36 generates an output S11 (FIG. 5F) having first and second pulses. On the other hand, if the counted wave number corresponds to a position detecting signal whose recording length is short, counter 36 generates the output signal S11 (FIG. 5F) having only a first pulse. In other words, counter 36 measures the recording length of the position detecting signals reproduced from the track that is scanned or traced by a rotary head during one revolution of the rotary drum. The output signal S11 from counter 36 is supplied to an identifying signal generator 37 and a timing pulse generator 38. The identifying signal generator 37 is also supplied with the signal S2 from timing signal generator 16. On the basis of the count measured by counter 36, identifying signal generator 37 determines the level of an identifying signal S12 (FIG. 5B) provided therefrom. More particularly, when no position detecting signal is detected at all during one revolution of the rotary drum, that is, during one period of the signal S2, which condition will be hereinafter referred to as a first mode, identifying signal generating circuit 37 cannot judge the track being scanned, and merely generates an identifying signal S12 whose polarity is inverted in response to each signal or pulse S2. When a position detecting signal having a long recording length and a position detecting signal having a short recording length are both detected during one revolution of the rotary drum, which condition will be referred to as a second mode, the rotary head is assumed to by simultaneously tracing adjacent tracks and, in this case also, the identifying signal generating circuit 37 cannot judge the track being scanned or traced so that identifying signal generating circuit 37 again supplies identifying signal S12 whose polarity is inverted in respons to each pulse of signal S2. When a position detecting signal having a short recording length is detected at least once and no position detecting signal having a long recording length is detected during one revolution of the rotary drum, which condition will be referred to as a third mode, it is assumed that the rotary head is tracing a track on which a position detecting signal having a short recording length is recorded, and that a track on which a position detecting signal having a long recording length is recorded will be scanned or traced during the next revolution of the rotary drum. In that case, identifying signal generator 37 causes identifying signal S12 to have a specific level, for example, high level "H" regardless of pulse or signal S2 and supplies such low level signal S12 to timing pulse generator 38. Finally, when a position detecting signal having a long recording length is detected at least once during one revolution of the rotary drum and no position detecting signal having a short recording time is detected, which condition will be referred to as a fourth mode, it is assumed that the rotary head is tracing a track on which a position detecting signal having the long recording length is recorded and that a track on which a position detecting signal having a short recording length is recorded will be scanned or traced during the next revolution. In such fourth mode, regardless of the signal S2, identifying signal S12 is made to assume a level different from that described above for the third mode, for example, a low level "L".

The timing pulse generator 38 responds to identifying signal S12 from identifying signal generator 37 and output signal S11 from counter 36 and generates, in response to the signals S11 and S12, a second sampling pulse SP2 (FIG. 5H) with a delay of a predetermined time, for example, the time tp after the generation of the first sampling pulse SP1. More particularly, in the case of identifying signal S12 being at low level "L", timing pulse generator 38 generates second sampling pulse SP2 only when output S11 supplied thereto from counter 36 is comprised of a pair of first and second pulses, and generator 38 does not generate second sampling pulse SP2 when the output S11 supplied thereto is comprised only of the first pulse. In the case of identifying signal S12 being at high level "H", timing pulse generator 38 generates the second sampling pulse SP2 only when output S11 supplied from the counter 36 has only the first pulse. When output S11 from counter 36 to timing pulse generator 38 has the first and second pulses and signal S12 is at the high level, generator 38 does not generate the second sampling pulse SP2. In other words, when identifying signal S12 is at low level "L", timing pulse generator 38 generates second sampling pulse SP2 in response to the position detecting signal having a long recording length, whereas, when identifying signal S12 is at high level "H", timing pulse generator 38 generates second sampling pulse SP2 in response to the position detecting signal having a short recording length.

Therefore, the generation of the second sampling pulse SP2 in the above mentioned first to fourth modes is as follows: In the first mode, no position detecting signal is detected so that sampling pulse generator 38 does not generate the second sampling pulse SP2; in the second mode, if the level of the identifying signal S12 is low level "L", sampling pulse generator 38 generates the second sampling pulse SP2 only when a position detecting signal having the long recording length is detected, whereas, if the level of the identifying signal S12 is high level "H", sampling pulse generator 38 generates the second sampling pulse SP2 only when a position detecting signal having the short recording length is detected; in the third third mode, the identifying signal S12 is at the high level "H" so that sampling pulse generator 38 generates the second sampling pulse SP2 only when the position detecting signal having the short recording length is detected; and, in the fourth mode, the identifying signal S12 is the low level "L" so that sampling pulse generator 38 generates the second sampling pulse SP2 only when a position detecting signal having the long recording length is detected.

The second sampling pulse SP2 generated by timing pulse generator 38 as set forth above is supplied to sample and hold circuit 32.

At the output side of sample and hold circuit 32, there is provided an adder 70. In normal operation, the signal derived from sample and hold circuit 32, a bias signal derived from a DC power source 71 and used as a reference for the normal operation, and a velocity error signal from a velocity servo system (not shown) are supplied to adder 70 and added together therein. The added signal from adder 70 is supplied through a motor drive circuit 72 to a capstan motor 73.

Further, in the embodiment being here described, there is provided a velocity control circuit 74. Specifically, this velocity control circuit 74 comprises a switch 75 provided between sample and hold circuit 32 and adder 70, a DC power source 76 connected in parallel to DC power source 71 and providing a potential which falls within a tracking servo pull-in range, a switch 77 used to change-over from one to the other of the DC power sources 76 and 71, a flip-flop circuit 78 for generating a switching signal which changes-over switches 75 and 77, and a counter 79 to be reset by signal S2 and which generates a signal "1" for setting flip-flop circuit 78 when the second sampling pulse SP2 is detected a predetermined number of times, for example, two times or four times during one revolution of the rotary drum. Switches 75 and 77 are positioned to engage the respective contacts a thereof when tracking servo is started. However, upon the starting of the tracking servo, when the second sampling pulse SP2 is detected two times or four times during one revolution of the rotary drum, as described above, so that flip-flop circuit 78 is set, switches 75 and 77 are changed-over to engage their contacts b and hence the normal tracking operation mode is established.

The operation of the circuit arrangement shown in FIG. 1 will now be described with reference to the signal waveforms shown in FIGS. 4A–4J and FIGS. 5A–5H.

Upon recording, in response to pulse PG from generator 71 indicating the rotary phases of heads 1A and 1B, timing signal generator 16 produces signal S2 shown in FIG. 4D. This signal S2 is supplied to and delayed for a predetermined time by delay circuit 21 so as to provide the signal S3 shown in FIG. 4E. This signal S3 is supplied to recording timing generators 22 to 25 as mentioned above so that recording timing generator 22 produces, at its output side, signal S5 shown in FIG. 4F. The switching signal S1 (FIG. 4A) from timing signal generator 16 is supplied to frequency divider 21' which produces, at its output, the signal S4 shown in FIG. 4C. This signal S4 is supplied to recording timing generators 23, 24 and 25 whereby, in response to signals S3 and S4, recording timing generators 23, 24 and 25 produce, at their outputs, the signals S6, S7 and S8 which are shown in FIGS. 4G, 4H and 4I, respectively.

The signals S5, S6, S7 and S8 are supplied as gating signals to recording waveform generators 10, 11, 12 and 13, respectively. Thus, recording waveform generator 10 passes therethrough the pilot signal P from oscillator or generator 6 at the predetermined times and for the predetermined periods tp determined by signal S5, as shown in FIG. 4F. The recording waveform generator 11 passes therethrough the position detecting signal S from oscillator 7 at each predetermined time and for the predetermined time period $\frac{1}{2}$tp or $\frac{1}{4}$tp determined by signal S6, as shown in FIG. 4G. The recording waveform generator 12 passes therethrough the position detecting signal T from oscillator 8 at each predetermined time and for the predetermined time period $\frac{1}{2}$tp or $\frac{1}{4}$tp determined by signal S7, as shown in FIG. 4H. The recording waveform generator 13 passes therethrough the erase signal $E_0$ from oscillator 9 at each predetermined time and for the the predetermined time period determined by signal S8, as shown in FIG. 4I.

The output signals from recording waveform generators 10 to 13 are added together or composed by OR gate circuit 14 so that, at the output side of OR circuit 14, there is produced the composed signal S9 shown in FIG. 4J.

At this time, let it be considered that, for example, head 1B records track 5B1 in FIG. 3 (in the first half period tB of FIG. 4). Then, the first and second pulses of signal S5 in FIG. 4F correspond in time to pilot signals PA1 and PA2, respectively; the first and second pulses of signal S6 in FIG. 4G correspond in time to position detecting signals SA1 and SA2, respectively; and the first and second pairs of pulses of signal S8 in FIG. 4I correspond in time to the erase signals $E_0$ which straddle the position detecting signals SA1 and SA2, respectively. In such case, signal S9 is composed of grouped intervals of the signals P, S and $E_0$ corresponding to the grouped signals PA1, $E_0$, SA1, $E_0$ and to the grouped signals PA2, $E_0$, SA2 and $E_0$ and which are produced at the output side of OR gate circuit 14 for each group.

Further, let it be considered that, for example, head 1A records track 5A2 in FIG. 3 (in the first half period tA of FIG. 4). Then, the first and second pulses of signal S5 in FIG. 4F respectively correspond in time to pilot signals PB3 and PB4; the first and second pulses of signal S7 in FIG. 4H respectively correspond in time to position detecting signals TB3 and TB4; and the first and second pulses of signal S8 in FIG. 4I respectively correspond in time to erase signals $E_0$ which are adjacent to one side of position detecting signals TB3 and TB4. In such case, signal S9 is composed of intervals of the signals T, $E_0$ and P corresponding to the grouped signals TB3, $E_0$, PB3 and to the grouped signals TB4, $E_0$ and PB4, and which are produced at the output side of OR circuit 14 for each group.

Further, when, for example, head 1B records track 5B2 in FIG. 3 (the second half period tB in FIG. 4), the first and second pulses of signal S5 in FIG. 4F respectively correspond to pilot signals PA3 and PA4; the first and second pulses of signal S6 in FIG. 4G respectively correspond to position detecting signals SA3 and SA4; and the first and second pairs of pulses of signal S8 in FIG. 4I respectively correspond to the erase signals $E_0$ which straddle position detecting signals SA3 and SA4.

In this case, the signal S9 is composed of intervals of the signals P,E,$_0$ and S corresponding to the grouped signals PA3,E$_0$,SA3, E$_0$ and the grouped signals PA4,E$_0$,SA4,E$_0$, and which are produced at the output of OR circuit 14 for each group.

Furthermore, when, for example, head 1A records track 5A3 in FIG. 3 (the second half period tA in FIG. 4), the first and second pulses of signal S5 shown in FIG. 4F correspond to pilot signals PB5 and PB6, respectively; the first and second pulses of signal S7 in FIG. 4H respectively correspond to position detecting signals TB5 and TB6; and the first and second pulses of signal S8 in FIG. 4 respectively corresponding to erase signals E$_0$ which are adjacent to one side of position detecting signals TB5 and TB6. In this case, the signal S9 is composed of intervals of the signals T,E$_0$ and P corresponding to the grouped signals TB5,E$_0$,PB5 and to the grouped signals TB6,E$_0$,PB6, and which are produced at the output side of OR circuit 14 for each group.

Moreover, timing signal generator 16 produces switching signal S1 (FIG. 4A) in response to pulse PG derived from pulse generator 17. This signal S1 is in synchronism with the rotation of rotary heads 1A and 1B so that, as shown in FIGS. 4A and 4B, during the half rotation period tA in which signal S1 is at a high level, head 1A comes in contact with magnetic tape 2, whereas, during the half rotation period tB in which the signal S1 is at a low level, head 1B comes in contact with magnetic tape 2. Switching circuit 15 is positioned by signal S1 to be in the illustrated state during the period tA and to be changed-over to the opposite state during the period tB.

Accordingly, when the switching circuit 15 is changed-over to the state opposite that illustrated on FIG. 1, signal S9 developed at the output of OR circuit 14 is supplied through amplifier 19B and the contact R of switching circuit 20B to head 1B, whereby signal S9 is recorded in record regions AT1 and AT2 at the beginning and end, respectively, of the contact period of head 1B with magnetic tape 2 within the period tB. Such record regions AT1 and AT2 for the tracking signal provided at opposite end portions of track 5B are spaced in the longitudinal direction along the track 5B from the center of the latter by equal distances. Such recording of the signal S9 occurs in an odd-numbered revolution of the heads, that is, in the first period tB on FIG. 4, for a time period tp+½tp+¼tp +¼tp and then for a time period tp+¼tp+¼tp+¼tp, whereas, period tB on FIG. 4 recording of the signal S9 occurs for a time period tp+½tp+¼tp+¼tp and then for a time period tp+¼tp+¼tp+¼tp.

On the other hand, when switching circuit 15 is disposed in the state illustrated on FIG. 1, signal S9 is supplied through amplifier 19A and contact R of switching circuit 20A to head 1A, whereby signal S9 is recorded in similar record regions AT1 and AT2 at the beginning and end of the contact region of head 1A with magnetic tape 2. As before, these similar record regions AT1 and AT2 provided at opposite end portions of the track SA are equally distant, in the longitudinal direction, from the central position of the track 5A. Such recording of the signal S9 occurs during an odd-numbered revolution of the heads (the first period tA of FIG. 4) for a time period ¼tp+tp+tp and then for a time period ¼tp+tp+tp, whereas, during an even-numbered revolution of the heads (the second period tA of FIG. 4), recording of the signal S9 occurs for a time period ¼tp+5/4tp+tp and then for a time period ¼tp+5/4tp+tp.

In the time periods between those in which the pilot signals, position detecting signals and erase signals are recorded, segment portions of audio PCM (pulse-code-modulated) signals to be recorded in respective tracks are supplied by a suitable circuit (not shown) through amplifier 19A to head 1A during the period tA, and through the amplifier 19B to head 1B during the period tB so that such audio PCM signals are recorded on the record regions AP1 of tracks 5A and 5B between the record regions AT1 and AT2.

The reproduction or playback of the signals recorded as mentioned above will now be described.

In the playback mode, motor 18 is servo-controlled by phase servo circuit 19 in a manner similar to that described for the recording mode.

The signals reproduced from magnetic tape 2 by rotary heads 1A and 1B are respectively supplied through contact P of switching circuit 20A and amplifier 26A and through contact P of switching circuit 20B and amplifier 26B to switching circuit 27. Switching circuit 27 is alternately changed-over by switching signal S1' (FIG. 5A) from timing signal generating circuit 16. Such switching signal S1' has a frequency of 30 Hz and effects change-over of switching circuit 27 between the half rotation period tA including the tape contact period of head 1A and the half rotation period tB including the tape contact period of head 1B. Accordingly, from switching circuit 27 there is derived an intermittent PCM signal SR with one segment of such PCM signal SR occurring during each half rotation period, as shown in FIG. 5C. This PCM signal SR is supplied to an audio playback circuit (not shown) which forms no part of the present invention, and in which a playback processor demodulates the signal SR to the original PCM signal, which is further supplied to a decoder. In the decoder, data of each block is detected by a block synchronizing signal, corrected for error, de-interleaved, reconverted to the analog audio signal by a D/A (digital-to-analog) converter and then fed to an audio output.

The tracking control is carried out in the following manner:

If head 1B traces the path having the tracing width W, as shown by one dot chain lines in FIG. 3, and which includes the track 5B1, head 1B also scans adjacent portions of tracks 5A2 and 5A1 which are adjacent to track 5B1. Thus, as shown in FIG. 3, in the region AT1, pilot signal PA1 recorded in track 5B1, pilot signal PB3 recorded in adjacent track 5A2 and pilot signal PB1 recorded in adjacent track 5A1 are successively reproduced by head 1B, while, in the region AT2, pilot signal PA2 recorded in track 5B1, pilot signal PB4 recorded in track 5A2 and pilot signal PB2 recorded in adjacent track 5A1 are successively reproduced by head 1B. The reproduced output of head 1B as derived from switching circuit 27, is also supplied to band pass filter 28 having the narrow pass band with the center pass band frequency f$_0$, and which passes therethrough only the pilot signals as its output SF (FIG. 5D). This output signal SF is supplied to envelope detector 29.

The output SR of switching circuit 27 is also supplied to position detecting signal detector 34 which produces, at its output side, the position detecting signal S10 shown in FIG. 5E. This signal S10 is supplied to pulse generator 35 and also to counter 36.

The pulse generator 35 generates the first sampling pulse SP1 which is substantially coincident with the first pulse of the signal S10, as shown in FIG. 5G. This sampling pulse SP1 is supplied to sample and hold circuit 30. At that time, as will be clear from FIGS. 5D and 5G, sample and hold circuit 30 is placed in the state to sample the crosstalk components of pilot signals PB3 and PB4 recorded in the adjacent track 5A2 at the side of track 5B1 facing in the direction opposite to the transportation direction of the magnetic tape 2 shown by the arrow 4T (FIG. 3). The signal thus sampled is supplied to one input terminal of differential amplifier 31 as the tracking signal having the advanced phase.

After the time tp following the initiation of each sampling pulse SP1, the crosstalk component of pilot signal PB1 or PB2 in the adjacent track 5A1 at the side of track SB1 facing in the tape transportation direction 4T is supplied from envelope detector 29 directly to the other input terminal of differential amplifier 31 as the tracking signal having the delayed phase. Accordingly, differential amplifier 31 compares tracking signals corresponding to the crosstalk components of pilot signals PB3,PB1 and of pilot signals PB4,PB2.

The compared error signal from differential amplifier 31 is supplied to sample and hold circuit 32, in which it is sampled by the second sampling pulse SP2 which is generated with the delay of time tp after the initiation of each sampling pulse SP1 generated by sampling pulse generator 38, as shown in FIG. 5H. Sampling pulse generator 38 generates each second sampling pulse SP2 on the basis of signal S11 (FIG. 5F) from counter 36 and identifying signal S12 (FIG. 5B) from identifying signal generating circuit 37. Accordingly, from sample and hold circuit 32, there is obtained a tracking control signal representing the difference between the inputs applied to differential amplifier 31. Such tracking control signal is supplied through switch 75 to adder 70, in which it is added with the velocity error signal and the bias signal supplied as a reference signal from DC power source 71 in the normal operation mode. The resulting signal is supplied from adder 70 through drive circuit 72 to capstan motor 73 for controlling the transportation speed of the magnetic tape 2. In other words, the transport speed of the tape is controlled so that the level difference between both inputs to differential amplifier 31 becomes zero. That condition is realized when rotary head 1B, in tracing track 5B1, overlaps or traces the margins of the adjacent two tracks 5A2 and 5A1 to the same extent. In other words, rotary head 1B is controlled in its scanning operation in such a manner that the center of head 1B, considered in the direction of width of its head gap, will coincide with the center or median of track 5B1.

The above described tracking operation is carried out similarly for the other tracks. For example, when track 5A2 is traced by head 1A, there are generated the crosstalk components of pilot signals PA3,PA4 and PA1,-PA2 recorded in the two adjacent tracks 5B2 and 5B1. Accordingly, the crosstalk components of pilot signals PA3 and PA4 recorded in track 5B2 are sampled by sampling pulse SP1 supplied from pulse generator 35 to sample and hold circuit 30 to thereby obtain a tracking signal. Then, this tracking signal is supplied to one input of differential amplifier 31 which, at its other input, receives the output from envelope detector 29 corresponding to the crosstalk components of pilot signals PA1 and PA2 recorded in track 5B1. In differential amplifier 31, the tracking signals corresponding to the crosstalk components of pilot signals PA3,PA1 and PA4,PA2 are compared, and the compared error signal is sampled by sample and hold circuit 32 in response to sampling pulse SP2. Thus, it is possible to obtain the tracking control signal for rotary head 1A.

Similarly, when track 5B2 is traced by head 1B, there are obtained the crosstalk components of pilot signals PB5,PB6 and pilot signals PB3,PB4 recorded in adjacent tracks 5A3 and 5A2, respectively. Since the crosstalk components of pilot signals PB5 and PB6 are sampled by sampling pulse SP1, the tracking signals corresponding to the crosstalk components of pilot signals PB5,PB3 and PB6,PB4 are compared by differential amplifier 31 and the resulting compared error signal is then sampled by sample and hold circuit 32 at sampling pulse SP2. Thus, it is possible to obtain a tracking control signal for rotary head IB during its tracing of track 5B2.

In like manner, when track 5A3 is traced by head 1A, there are obtained the crosstalk components of pilot signals PA5,PA6 and pilot signals PA3,PA4 recorded in adjacent tracks 5B3 and 5B2, respectively. Accordingly, the crosstalk components of pilot signals PA5 and PA6 are sampled in response to sampling pulse SP1, and the tracking signals corresponding to the crosstalk components of pilot signals PA5,PA3 and PA6,PA4 are compared by differential amplifier 31. The, the resulting compared error signal is finally sampled in response to sampling pulse SP2 to obtain a tracking control signal for head 1A during its tracing of track 5A3.

In the tracking servo operation, a case may arise in which a rotary head traces a track having the opposite azimuth at the start of the tracking operation, in which case, the position detecting signal is not detected and hence the sampling pulse is not generated. Accordingly, upon starting, switches 75 and 77 are positioned to engage their respective contacts a so as to cut off the output of sample and hold circuit 32 from adder 70 and to apply to adder 70 from DC power source 76 a potential that falls within the tracking servo pull-in range and serves as a velocity servo signal.

In connection with the above, let it be assumed that rotary head 1B is placed on, for example, track 5A1 shown in FIG. 3 so that such head is in the opposite azimuth state to the track being initially scanned. When rotary head 1B traces the track 5A1 without any drift, that is, rotary head 1B is placed in the so-called on-track condition on track 5A1, position detecting signals TB1 and TB2 are not detected so that no sampling pulse is generated. However, when the bias signal from DC power source 76 is applied to adder 70 with an offset, for example, of +10% relative to the bias signal from DC power source 71, the capstan driven by motor 73 transport the tape so that a track, for example, track 5B5 having the same azimuth as head 1B, always becomes aligned with head 1B so that the position detecting signals SA9 and SA10 recorded thereon are detected. Thus, the sampling pulse is generated on the basis of these position detecting signals SA9 and SA10.

Then, this sampling pulse (the second sampling pulse SP2 in this example) is counted by counter 79. If the sampling pulse is detected a predetermined number of time, for example, twice or four times during one revolution of the rotary drum, flip-flop circuit 78 is set. The resulting set output from flip-flop circuit 78, changes-over switches 75 and 77 to engage their respective contacts b and thereby change-over the present operation speed t the normal speed.

Figure 6:
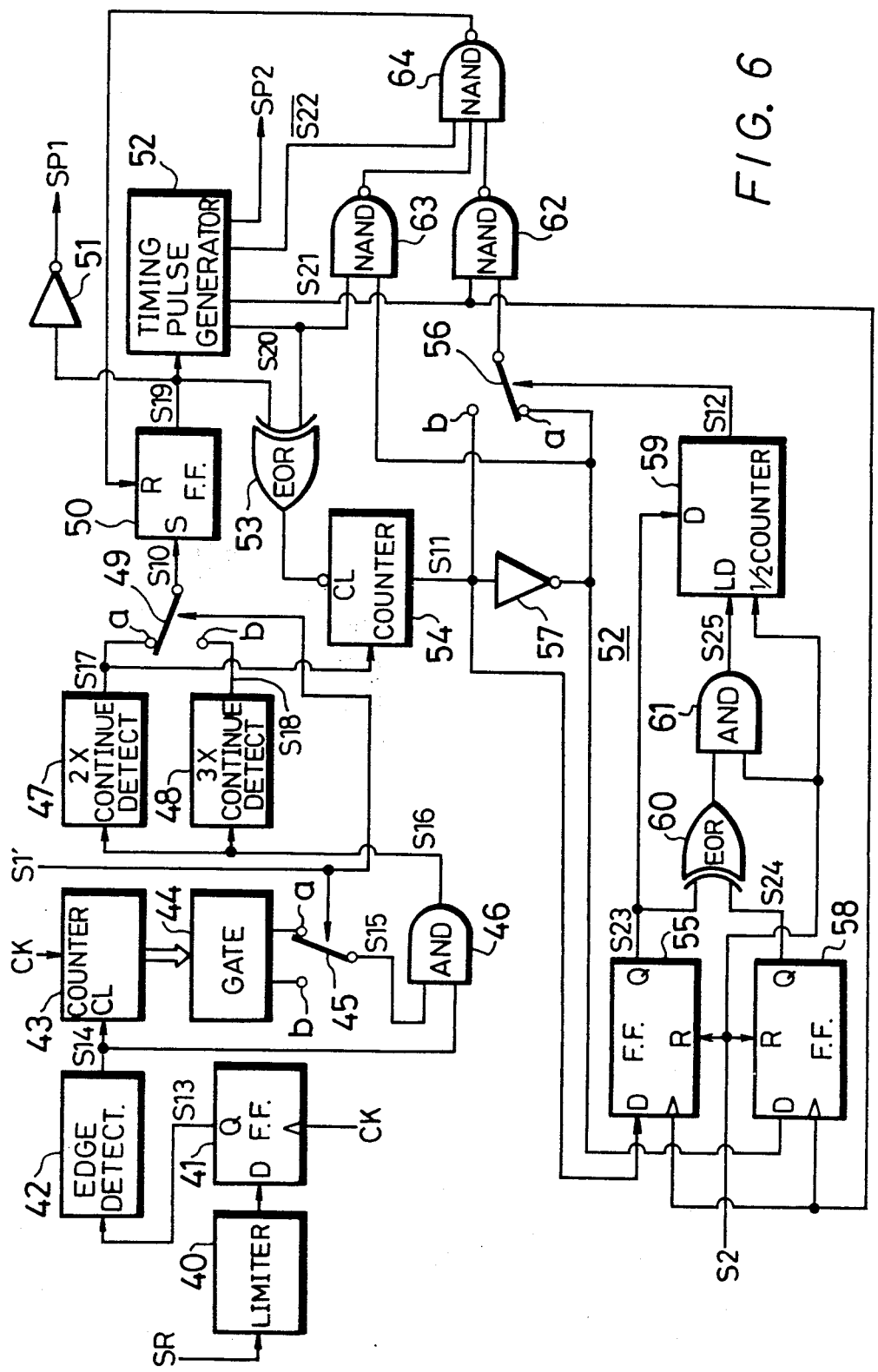
FIG. 6 is a circuit block diagram showing a specific example of a main portion of the tracking control apparatus according to the present invention.

FIG. 6 illustrates a practical circuit arrangement for generating the first and second sampling pulses SP1 and SP2, and which includes a limiter 40 receiving signal SR from switching circuit 27 (FIG. 1). A D-type flip-flop circuit 41 receives the output of limiter 40 and further is supplied, at its clock terminal, with a clock signal CK (FIG. 7A). An edge detecting circuit 42 detects the edge of the output from flip-flop circuit 41. The output from this edge detecting circuit 42 is supplied to a clear terminal CL of a counter 43 as a clear signal. The counter 43, from the time at which it is cleared, begins to count the clock signal CK (FIG. 7A) which is also supplied to a clock terminal of counter 43.

A gate circuit 44 having a decoding function selectively supplies to contacts a and b of a switch 45, on the basis of the counted results of counter 43, an output corresponding to the frequency of the position detecting signal. In other words, the position detecting signals S and T are different in frequency as mentioned above. More specifically, during recording, if position detecting signal S has the frequency of 522.67 kHz, it is normally recorded with a half-wave spacing of $9 \times Tck$ (Tck is the minimum clock length of the recording signal) whereas, if the position detecting signal T has the frequency of 784.00 kHz, it is normally recorded with the half-wave spacing of $6 \times Tck$. Therefore, in view of the factors causing fluctuation in the reproducing mode, if $(9 \pm 1)Tck$, for example, is detected, the position detecting signal S is used, whereas, if $(6 \pm 1)Tck$ is detected, the position detecting signal T is used. Accordingly, gate circuit 44 supplies, when the counted content of counter 43 is $(9 \pm 1)Tck$, the output corresponding to position detecting signal S to the contact a of switch 45, while the gate circuit 44 supplies, when the counted content of the counter 43 is $(6 \pm 1)$ Tck, the output corresponding to the position detecting signal T to the contact b of switch 45. The switch 45 is suitably changedover by a switching signal S1'. For example, when switching signal S1' is at a low level, switch 45 is connected to contact a, while, when switching signal S1' is at a high level, switch 45 engages its contact b. If the position detecting signal is accurately reproduced, a signal S15 derived from switch 45 is 20 pulses when a position detecting signal S being reproduced has the short recording length tp/4 or the signal S15 is 40 pulses when the position detecting signal S being reproduced has the long recording length is tp/2. Alternatively, signal S15 is 30 pulses when a position detecting signal T having the short recording length tp/4 is being reproduced, or 60 pulses when the position detecting signal T being reproduced has the long recording length tp/2.

The output S15 of switch 45 and the output S14 of edge detector 42 are both supplied to an AND circuit 46. The output of AND circuit 46 is supplied to $2 \times$ continuation and $3 \times$ continuation detectors 47 and 48. These detectors 47 and 48 are provided to reduce erroneous detection of other patterns as position detecting signals. Accordingly, the numbers of detections by the detectors 47 and 48 are selected to ensure against mis-detections. The $2 \times$ continuation detector 47 produces an output when it detects the output of AND circuit 46 2 times, while the $3 \times$ continuation detector 48 produces an output when it detects the output of AND circuit 46 3 times continuously.

The outputs S17 and S18 of detectors 47 and 48 are alternately supplied through a switch 49 to a set terminal S of a flip-flop circuit 50. Switch 49 is engaged with its contact a when switching signal S1' is at a low level and with its contact b when switching signal S' is at a high level similarly to switch 45. The output S19 of flip-flop circuit 50 is inverted by an inverter 51 and delivered from the latter as the first sampling pulse SP1. The output S19 of flip-flop circuit 50 is also supplied to a timing pulse generator 52 and to an exclusive-OR (hereinafter simply referred to as an EOR) circuit 53. A first output S20 of timing pulse generating circuit 52 is also supplied to EOR circuit 53, and the output of EOR circuit 53 is supplied to a clear terminal CL of a counter 54. The counter 54 is adapted to count the output of, for example, two time continuation detector 47. Alternatively, counter 54 may count the output of $3 \times$ continuation detector 48 or the output of switch 49. Counter 54 counts the number of pulses in the output from detector 47 separately during a former half tp/4 and a latter half tp/4 and is placed in the state to produce an output S11 from counter 54 if the counted number is more than a predetermined value (for example, more than 6 pulses) which is determined in dependence on the mis-detection number and the detection ability. More specifically, when the pulse number counted during the former half tp/4 is more than the predetermined value and the pulse number counted during the latter half tp/4 is less than the predetermined value, counter 54 judges the reproduced position detecting signal as being a position detecting signal having the short recording length and (tp/4) and produces the signal S11 having only the first pulse. On the other hand, if the pulse number counted during the former half period tp/4 is more than the predetermined value and the pulse number counted during the latter half period tp/4 is also more than the predetermined value, counter 54 judges such reproduced position detecting signal as being a position detecting signal having the long recording length (tp/2) and produces the signal S11 formed of the first and second pulses. Further, if the number of pulses counted during the former half period tp/4 is less than the predetermined value, counter 54 judges the signal causing such count to be the result of mis-detection and no signal is provided at the output of counter 54.

The output of counter 54 is supplied to an input terminal D of a D-type flip-flop circuit 55, to a contact terminal b of a switch 56, and further through an inverter 57 to an input terminal D of a D-type flip-flop circuit 58 and to a contact a of switch 56. The output of flip-flop circuit 55 is supplied to a data input terminal D of a ½-counter 59 and to one input terminal of an exclusive-OR (EOR) circuit 60. This EOR circuit 60 is supplied at another input terminal with the output of flip-flop circuit 58. The output of EOR circuit 60 is supplied to one input terminal of AND circuit 61 which, at another input terminal, is supplied with signal S2. This signal S2 is also supplied to reset terminals R of flip-flop circuits 55 and 58 and to ½-counter 59. The output of AND circuit 61 is supplied to a load terminal LD of ½-counter 59. The ½-counter 59 provides at its output, when the output of AND circuit 61 is supplied to load terminal LD, the value of the data terminal D, while in other cases, ½-counter 59 produces an output which is inverted in response to the polarity of signal S2. The output S12 of ½-counter 59 is supplied as a switching signal to switch 56 and serves to identify whether the track now being traced has recorded thereon a position signal having a long recording length or a short recording length.

The changed-over output of switch 56 is supplied to one input terminal of a NAND circuit 62 which is supplied at its other input terminal with a second output signal S21 from timing pulse generator 52. The second output S21 is also supplied to the clock terminals of flip-flop circuits 55 and 58. The output of inverter 57 is supplied to one input terminal of a NAND circuit 63 which is supplied at its other input terminal with first output S20 of timing pulse generator 52.

The outputs of NAND circuits 62 and 63 and a third output $\overline{S22}$ of timing pulse generator 52 are supplied to a NAND circuit 64. The output from NAND circuit 64 is supplied to a reset terminal R of flip-flop circuit 50 so that flip-flop circuit 50 is reset when the output of NAND circuit 64 attains a high level. The timing pulse generator 52 is adapted to generate a fourth output as second sampling pulse SP2 with a delay of a predetermined time, for example, at the time tp after first sampling pulse SP1 is generated.

In the arrangement described above with reference to FIG. 6, circuit elements 40 to 49 correspond to position detecting signal detector 34 in FIG. 1, circuit elements 50 and 51 correspond to pulse generator 35 in FIG. 1, circuit element 54 corresponds to counter 36 in FIG. 1, circuit elements 55 and 57 to 61 correspond to identifying signal generator 37 in FIG. 1 and circuit elements 52, 53, 56 and 62 to 64 correspond to timing pulse generator 38 in FIG. 1.

The operation of the circuit arrangemen shown in FIG. 6 will now be described with reference to FIGS. 7 to 10.

Let it be assumed that signal SR from switching circuit 27 is supplied through limiter 40 to flip-flop circuit 41 and that a clock signal CK (FIG. 7A) is supplied to flip-flop circuit 41 and, on the basis of this clock signal CK, flip-flop circuit 41 produces at its output side a signal S13 (FIG. 7B). This signal S13 is continuous, as during each the durations 5T, 6T and 7T, and it thus indicates the fact that position detecting signal T of high frequency is reproduced. When signal S13 is supplied to edge detecting circuit 42, the edges of signal S13 are detected and, at the output of detector 42 there is generated a signal S14 (FIG. 7C). Signal S14 is supplied to counter 43 as a clear signal for the latter so that counter 43 counts clock signal CK during each period in which signal S14 is at low level. The counted content of counter 43 is decoded by gate circuit 44, delivered to contact b of switch 45 and then developed at the output side of switch 45 as the signal S15 (FIG. 7D). This signal S15 and signal S14 are supplied to respective inputs of AND circuit 46 and thus a signal S16 (FIG. 7E) is generated at the output side of AND circuit 46. This signal S16 is supplied to detectors 47 and 48. When detector 47 detects signal S16 twice continuously, detector 47 produces at its output side a signal S17 (FIG. 7F) and, when detector 48 detects signal S16 three times continuously, detector 48 produces, at its output, a signal S18 (FIG. 7G).

As earlier noted, FIGS. 7A to 7G illustrate the case where a position detecting signal T of high frequency is reproduced, and FIGS. 8A to 8F similarly illustrate a case where a position detecting signal S of low frequency is reproduced. In the case of the position detecting signal S, the duration of the signal to be detected is also made long, for example, as indicated at each of 8T, 9T and 10T on FIG. 8A.

In the latter case of a reproduced position detecting signal S, the operation is similar to that described above for the position detecting signal T except for the fact that the signal S15 shown on FIG. 8C is derived from contact a of switch 45 which has been changed-over by switching signal S1'.

The outputs of detectors 47 and 48 are respectively supplied to the contacts a and b of switch 49 which is also changed-over by switching signal S1'. The signal S10 is obtained as the output of switch 49. In the normal operation mode, in the case of the position detecting signal T having the high frequency and the position detecting signal S having the low frequency, the first pulses of position detecting signals T and S are substantially equal to the first duration of signal S10.

The operations of the circuit elements provided after detectors 47 and 48 will now be described below with reference to FIGS. 9A–9M, ① in which indicates signal waveforms at respective points of the above mentioned first mode and ② indicates signal waveforms at respective points of the above mentioned second mode, and with reference to Figs. 10A–10M, in which ③ indicates signal waveforms at respective points of the above mentioned third mode and ④ indicates signal waveforms at respective points of the above mentioned fourth mode.

Since no position detecting signal is detected in the first mode ①, as shown in FIG. 9C, no first sampling pulse SP1 (FIG. 9E) and no second sampling pulse SP2 (FIG. 9M) are produced at all.

In the second mode position ②, position detecting signals having long and short recording lengths are both detected while tracing a single track so that, at the output side of switch 49 (FIG. 6), there is produced a signal S10, as shown in FIG. 9C. In such signal S10 shown on FIG. 9C, the initial signal portion corresponds to the position detecting signal having the short recording length (tp/2). while the later signal portion corresponds to the position detecting signal having the long recording length (tp/2). This signal S10 is supplied to flip-flop circuit 50 so that the latter produces, at its output, a signal S19 having a predetermined width measured from the first pulse of signal S10, as shown in FIG. 9E. This signal S19 is inverted by inverter 51 and then supplied to sample and hold circuit 30 (FIG. 1) as first sampling signal SP1.

The signal S19 is also supplied to timing pulse generating circuit 52 which generates the first output S20 with a delay of a predetermined time period, for example, the time period tp/4, from the leading edge of signal S19, as shown in FIG. 9F. This first output S20 and signal S19 are both supplied through EOR circuit 53 to counter 54 as the clear signal for the latter. Counter 54 counts signals S17 from detector 47 during the former half period or tp/4 and during the latter half period of tp/4 separately from a time at which it is cleared. If the number of pulses of signal S17 counted during the former half period of tp/4 is more than the predetermined value and the number of pulses of signal S17 counted during the latter half period of tp/4 is less than the predetermined value, counter 54 judges such signal as being a position detecting signal having the short recording length and produces the signal S11 with only a first pulse, as shown at the initial position in FIG. 9D. If the numbers of pulses of signal S17 counted during the former half period of tp/4 and during the latter half period of tp/4 are both more than the predetermined value, counter 54 judges such signal as being a position detecting signal having the long recording length and provides signals S11 with both first and second pulses, as shown at the later position in FIG. 9D.

Signal S11 is supplied to input terminal D of flip-flop circuit 55. Signal S11 is also inverted by inverter 57 and then supplied to input terminal D of flip-flop circuit 58. Further, after a delay of a predetermined time period, for example, the time period tp/4, relative to first output S20, timing pulse generator 52 provides a second output 21 (FIG. 9G) which is supplied as the clock signal to flip-flop circuits 55 and 58. Accordingly, at the outputs of flip-flop circuits 55 and 58, there are generated signals S23 and S24, respectively (FIGS. 9I and 9J). These signals S23 and S24 are supplied through EOR circuit 60 an AND circuit 61 which is also supplied with signal S2 so that AND circuit 61 generates, at its output, a signal S25 of low level (FIG. 9K). Since this signal S25 supplied to load terminal LD of ½-counter 59 is low in level, ½-counter 59 does not load signal S23 supplied to its data terminal D. In other words, ½-counter 59 produces an identifying signal S12 (FIG. 9L) which is changed in dependence on signal S2. Switch 56 is changed-over by signal S12 so that, when signal S12 is low, switch 56 is positioned to engage its contact a, whereas, when signal S12 is high, switch 56 is positioned to engage its contact b. Further, timing pulse generator 52 generates a third output S22 (FIG. 9H) in the form of a negative pulse delayed a predetermined time period, for example, tp, after the leading edge of signal S19 (FIG. 9E).

NAND circuits 62,63 and 64 select which one of the outputs S20,S21 and S22 from generator 52 should be used as the reset signal for flip-flop circuit 50. When signal S10 is detected but the first pulse of signal S11 is low, that is, a position detecting signal is not detected at all, the first output S20 of generator 52 is selected as the reset signal for flip-flop circuit 50. In other words, in this case, the signal S10 is irrelevant to the polarity of the identifying signal S12. On the other hand, when identifying signal S12 is low and it is expected that a position detecting signal having the long recording length will be reproduced, if only the first pulse of signal S11 is generated, second output S21 (FIG. 9G) from generator 52 is selected as the reset signal and the second sampling pulse SP2 is not generated. When identifying signal S12 is low and the first and second pulses of signal S11 are generated, third output S22 (FIG. 9H) from generator 52 is selected as the reset signal and the second sampling pulse SP2 (FIG. 9M) is generated. Further, when identifying signal S12 is high and it is expected that a position detecting signal having the short recording length will be reproduced, if only the first pulse of signal S11 is generated, third output S22 from generator 52 is selected as the reset signal and the second sampling pulse SP2 is produced. Furthermore, when identifying signal S12 is high and first and second pulses of signal S11 are generated, second output S21 from generator 52 is selected as the reset signal and a second sampling pulse SP2 is not generated.

Accordingly, in the second mode ②, signal S19 corresponding to the position detecting signal having the short recording length is reset by the second output S21 and signal S19 corresponding to the position detecting signal having the long recording length is reset by the third output S22.

Timing pulse generator 52 is adapted to generate a a fourth output in the form of, second sampling pulse SP2 (FIG. 9M) delayed by the time tp after the first sampling pulse SP1 (FIG. 9E). However, in the case of the position detecting signal having the short recording length in the second mode, flip-flop circuit 50 which precedes generator 52 is reset before expiration of the delay tp as described above so that timing pulse generator 52 does not generate the second sampling pulse SP2. On the other hand, in the case of the position detecting signal having the long recording length in the second mode, flip-flop circuit 50 is not yet reset in the midst of the delay period tp so that timing pulse generator 52 generates the second sampling pulse SP2 as shown in FIG. 9M, and this second sampling pulse SP2 is supplied to sample and hold circuit 32 (FIG. 1).

In the third mode ③, the position detecting signal having the short recording length is detected more than one time so that switch 49 generates, at its output, signal S10 shown in FIG. 10C. This signal S10 is supplied to flip-flop circuit 50 which generates signal S19 (FIG. 10E) having a predetermined width measured from the first pulse of each signal S10. This signal S19 is inverted by inverter 51 and then supplied to sample and hold circuit 30 (FIG. 1) as the first sampling pulse SP1.

The signal S19 is also supplied to timing pulse generator 52 which generates, at its output, a first output S20 delayed by the time period tp/4 from the leading edge of signal S19 as shown in FIG. 10F. This output S20 and signal S19 are both supplied through EOR circuit 53 to counter 54 as a clear signal for the latter. From the time at which it is cleared, counter 54 starts counting signal S17 from detector 47 as described above. In the case of mode ③, the number of pulses of signal S17 counted during the initial half period tp/4 is more than the standard value and the number of pulses of signal S17 counted during the later half period tp/4 is less than the predetermined value so that signal S17 is seen to be a position detecting signal having the short recording length. Thus, counter 54 produces signal S11 having only the first pulse, as shown in FIG. 10D.

The signal S11 is supplied directly to input terminal D of flip-flop circuit 55 and also inverted by inverter 57 and then supplied to input terminal D of flipflop circuit 58. These flip-flop circuits 55 and 58 are supplied at their clock terminals with the second output S21 (FIG. 10G) from timing pulse generator 52 so that signals S23 and S24 (FIGS. 10I and 10J) are provided at the outputs of flip-flop circuits 55 and 58, respectively. These signals S23 and S24 are supplied through EOR circuit 50 to AND circuit 61 so that the latter produces, at its output, a signal S25 shown in FIG. 10K. This signal S25 is supplied to load terminal LD of ½-counter 59 and causes signal S23 supplied to the data terminal D of ½-counter 59 to be loaded therein. In response to such loading of signal S23, identifying signal S12 at the output of ½-counter 59 is inverted to the low level at the end of the third mode, as shown in FIG. 10L. In other words, although the leading edge of identifying signal S12 at the initiation of the third mode is merely changed in dependence on the polarity of signal S2, the trailing edge of identifying signal S12 at the termination of the third mode is changed to the low level with the assumption that during the nex revolution of the rotary drum, that is, in the fourth mode, a track on which is recorded a position detecting signal having the long recording length will surely be traced because a position detecting signal having the short recording length is recorded in the track which is now being traced during one revolution of the rotary drum, that is, during the period of signal S2.

In the third mode, since identifying signal S12 is at a high level and only the first pulse of signal S11 is generated, third output S22 is selected as the reset signal for flip-flop circuit 50. In the third mode, flip-flop circuit 50 is not reset during the time period tp so that timing pulse generator 52 generates second sampling pulse SP2 as shown in FIG. 10M.

In the fourth mode ④, since a position detecting signal having the recording length is detected more than once, switch 49 produces, at its output, the signal S10 shown in FIG. 10C. This signal S10 is supplied to flip-flop circuit 50 which produces, at its output, the signal S19 of predetermined width measured from the first pulse of each signal S10, as shown in FIG. 10E. Signal S19 is inverted by the inverter 51 and then supplied to sample and hold circuit 30 (FIG. 1) as the first sampling pulse SP1.

The signal S19 is also supplied to timing pulse generator 52 which generates, at its output, the first output S20 delayed by tp/4 from the leading edge of signal S19, as shown in FIG. 10F. This output signal S20 and signal S19 are supplied through EOR circuit 53 to counter 54 as a clear signal. From the time at which the counter 54 is cleared, it starts counting signal S17 derived from detector 47 as described above. In the case of mode ④, since the numbers of pulses of signal S17 counted during the former half of tp/4 and the latter half of tp/4 are both more than the predetermined value, such signal S17 is regarded as a position detecting signal having the long recording length. As a result, counter 54 generates signal S11 having the first and second pulses, as shown in FIG. 10D.

The signal S11 is supplied directly to input terminal D of flip-flop circuit 55, and through inverter 57 to input terminal D of flip-flop circuit 58. These flip-flop circuits 55 and 58 are supplied at their clock terminals with second output S21 (FIG. 10G) from timing pulse generator 52 so that flip-flop circuits 55 and 58 generate, at their outputs, signals S23 and S24 as shown in FIGS. 10I and 10J, respectively. These signals S23 and S24 are supplied through EOR circuit 60 to AND circuit 61 and the latter generates, at its output, the signal S25 shown in FIG. 10K. This signal S25 is supplied to load terminal LD of ½-counter 59 and, in response thereto, the signal S23 supplied to data terminal D of the ½-counter 59 is loaded into the latter. In response thereto, identifying signal S12 developed at the output of ½-counter 59 is inverted to the high level at the end of the fourth mode as shown in FIG. 10L. In other words, the leading edge of identifying signal S12 is changed to the high level at the end of the fourth mode under the assumption that, a position detecting signal having the long recording length is recorded on the track which is now being traced during a revolution of the rotary drum (the period of the signal S2) and that a track on which a position detecting signal having the short recording length is recorded surely will be scanned during the next revolution of the rotary drum, that is, in the fifth mode (not shown).

In the fourth mode, since identifying signal S12 is at the low level and the first and second pulses of signal S11 are generated, the third output $\overline{S22}$ generator 52 is selected as the reset signal for flip-flop circuit 50. Further, in the fourth mode, during the time period tp, flip-flop circuit 50 is not reset so that timing pulse generator 52 generates the second sampling pulse SP2, as shown in FIG. 10M.

It will be appreciated that, in the embodiment of the invention described above, a position detecting signal reproduced during one revolution of the rotary drum is detected, it is judged whether the detected position detecting signal has a short or long recording length and in response to such judged result there is immediately generated an identifying signal which identifies the track to be traced or scanned during the next revolution of the rotary drum. Accordingly, even if the track indicated by the identifying signal and the next track in practice are not coincident with each other in the initial state, that is, when starting the tracking operation and which corresponds to the above mentioned second mode, the correct judged result can be obtained during the next revolution of the drum so that the tracking pull-in time is reduced, and stable tracking control is achieved.

Further, velocity control is provided after the sample and hold 32 so that, during a predetermined time after the operation is started, the speed of the capstan which transports the record medium is changed to a predetermined extent from that for the normal operation mode. By reason of the foregoing, even in starting of the tracking servo, the position detecting signal is detected and, as a result, a sampling pulse can be generated rapidly. Thus, the starting characteristic of the tracking servo can be improved and tracking control can be accurately carried out substantially over the whole range of the tracking servo.

Although a single preferred embodiment of the invention has been described above with reference to the drawings, it will be apparent that the invention is not limited to that precise embodiment, and that many modifications and variations could be effected by one skilled in the art without departing from the spirit or scope of the invention as defined by the appended claims.

What is claimed is:

1. A tracking control apparatus for controlling tracking alignment of a rotary head with respect to record tracks appearing in succession on a record medium and in each of which there are recorded, at predetermined positions varying from track to track in accordance with a predetermined repeating sequence, pilot signals for controlling tracking and position detecting signals having different recording lengths and which identify said positions of the pilot signals in adjacent tracks, comprising:

reproducing mean responsive to the output of said rotary head for reproducing said position detecting signals recorded in a track traced by said rotary head; detecting means for detecting said recorded length of each position detecting signal reproduced by said reproducing means; means responsive to said detecting means for providing an identifying signal which identifies said recording length of a position detecting signal reproduced from the track traced by said rotary head; and generating means responsive to said identifying signal for generating a sampling signal timed to sample the pilot signals reproduced as cross-talk from tracks adjacent to said track being traced by said rotary head.

2. A tracking control apparatus according to claim 1; in which said position detecting signals are recorded in respective tracks with long and short recording lengths; and wherein said means for providing said identifying signal generates a first state of the latter for indicating that a position detecting signal having a short recording length will be reproduced from a predetermined track only when a position detecting signal having a long recording length is detected more than once from said track traced by said rotary head, and generates a second state of said identifying signal for indicating that a position detecting signal having a long recording length will be reproduced after a predetermined track, only when a position detecting signal having a short recording length is detected more than once from said track traced by the rotary head.

3. A tracking control apparatus according to claim 1; wherein said generating means generates a sampling signal when said identifying signal indicates that a position detecting signal having a long recording length will be reproduced and reproduction of a position detecting signal having a long recording length is detected, and when said identifying signal indicates that a position detecting signal having a short recording length will be reproduced and reproduction of a position detecting signal having a short recording length is detected.

4. A tracking control apparatus according to claim 1, wherein said detecting means includes counter means supplied with an output of said reproducing means, means for clearing said counter means during a time period corresponding to a position detecting signal having a short recording length, said counter means generating a first pulse when a position detecting signal having said short recording length is detected in a predetermined cycle and generating first and second pulses when a position detecting signal having a long recording length is detected in said predetermined cycle.

5. A tracking control apparatus according to claim 4, wherein said means for providing an identifying signal includes inverting means for inverting the output of said counter means, first and second holding means for holding outputs of said counter means and said inverting circuit, respectively, at each point in time corresponding to a position detecting signal having a long recording length, frequency dividing counter means for dividing a pulse generated at every predetermined track and for generating said identifying signal, and means for changing the state of said frequency dividing counter means in respons to the outputs of said first and second holding means.

6. A tracking control apparatus according to claim 4, wherein said generating means for generating a sampling signal comprises bi-stable means set by the output of said reproducing means, means for generating a first sampling pulse in response to an output of said bi-stable means, timing pulse generating means for generating a first timing pulse corresponding to a position detecting signal having a short recording length, a second timing pulse corresponding to a position detecting signal having a long recording length, a second sampling pulse and a third timing pulse in response to the output of said bi-stable means, and logic means supplied with said first timing pulse, said second timing pulse and said third timing pulse and also with an output of said counter means or an output of said inverting means in response to an output of said frequency-dividing counter, said logic means resetting said bi-stable means by said first timing pulse when said first pulse is absent from the output of said counter means, said logic means resetting said bi-stable means by said second timing pulse when said identifying signal has a first level and only said first pulse is generated, said logic means resetting said bi-stable means by said third timing pulse when said identifying signal has said first level and said first and second pulses are generated, said logic means resetting said bi-stable means by said third timing pulse when said identifying signal has a second level and only said first pulse is generated, and said logic means resetting said bi-stable means by said second pulse when said identifying signal has the second level and said first and second pulses are generated.

7. A tracking control apparatus according to claim 1; wherein said reproducing means includes cycle detecting means for detecting a cycle of said position detecting signal from a signal reproduced by said rotary head, and continuous cycle detecting means connected to said cycle detecting means for detecting a continuous cycle of the position detecting signal.

8. A tracking control apparatus according to claim 7; wherein said cycle detecting means includes limiter means supplied with said output from said rotary head, an edge detecting circuit for detecting an edge of an output from said limiter means, counter means connected with said edge detecting circuit and being cleared at ever detected edge for counting a clock and gating means connected with said counter means for generating a pulse when a count of said counter means corresponds to a position detecting signal.

9. A tracking control apparatus according to claim 1; further comprising sample and hold means for sampling a pilot signal reproduced as cross-talk from an adjacent track in response to said sampling signal and for holding the same, speed control means provided after said sample and hold means for controlling the transporting speed of said record medium in accordance with the sampled and held pilot signal, and means for changing the controlled transporting speed by a predetermined amount from a normal tape transporting speed during a predetermined time period after commencement of tracking control operation.

* * * * *